July 8, 1969    J. L. CHANDLER    3,453,769
FLY LEADER FOR FLY FISHING LINE
Filed May 15, 1967

*INVENTOR.*
JAMES LEON CHANDLER
BY *James and Franklin*
ATTORNEYS 3,453,769
FLY LEADER FOR FLY FISHING LINE
James Leon Chandler, Homer, N.Y., assignor to Cortland Industries, Inc., Cortland, N.Y., a corporation of New York
Filed May 15, 1967, Ser. No. 638,289
Int. Cl. A01k 91/04
U.S. Cl. 43—44.98                                8 Claims

ABSTRACT OF THE DISCLOSURE

A fly leader comprising a nylon butt section connected to a nylon tippet section, the butt section being larger in diameter than the tippet section, and being made of a nylon having a greater stiffness modulus than the tippet section. The butt section tapers from the fishing line to the tippet section, and the latter tapers from the butt section to the fly. The tensile strength of the nylon used for the tippet section is greater than that of the butt section.

BACKGROUND OF THE INVENTION

Sport fishing with artificial flies or bugs is popular. For convenience the artifical fly, bug or insect may be referred to simply as a lure. To make an effective presentation of the lure to the fish, it must be attached to the relatively heavy opaque fly line by means of a leader.

For many years anglers used silkworm gut as a leader material. Using sections each of uniform thickness, a tapered leader was formed by using as many as six or eight separate pieces joined by knots. The heaviest diameter section was nearest to fly line, with each succeeding section being smaller in diameter, until the last section or tip of the leader was fine enough to permit delicate presentation of the fly. The many knots necessary to join the various sections were considered objectionable.

On development of linear polyamide thread, leaders at first were fashioned from sections of this material in much the same manner as above described for silkworm gut. Thereafter methods were devised whereby monofilament threads could be tapered from a relatively heavy diameter to a thin diameter, thus eliminating the knots.

Such tapered nylon leaders, however, have two deficiencies. If the heavy butt end of the leader is large enough to carry through and support the balance of the leader and fly on the cast, it cannot be drawn fine enough at the tip end to allow delicate presentation of small artificial flies. Conversely, those leaders small enough at the tip cannot be made heavy enough in the butt to carry through the natural momentum from the fly line as the artificial fly is being cast.

Synthetic polymers are produced from formulas that can provide either a stiffer and weaker characteristic, or a more flexible and stronger characteristic. If the stiffer material is used, the tip section does not have sufficient break strength for many fishing purposes and still allow delicacy of presentation of the fly to the water without scaring the wily fish.

If the stronger material is used the butt section of the leader will not have sufficient body or stiffness to continue the momentum of the cast. Too much flexibility in the butt section of a leader will oftentimes allow the leader to collapse, thus throwing the cast off the intended target.

SUMMARY OF THE INVENTION

The present leader utilizes the desirable characteristics of both the more flexible and the stiffer polymer materials, for the benefit of the angler. The leader consists of two parts, a nylon butt section, and a nylon tippet section, the butt section being larger in diameter, but tapering toward the tippet section, and the tippet section tapering toward the lure. The butt section is made of a nylon having a greater stiffness modulus than the tippet section, while the tippet section is made of a nylon having a smaller stiffness modulus but a greater tensile strength.

The foregoing and additional features are described in the following specification, which is accompanied by the drawings in which.

Figure 1:
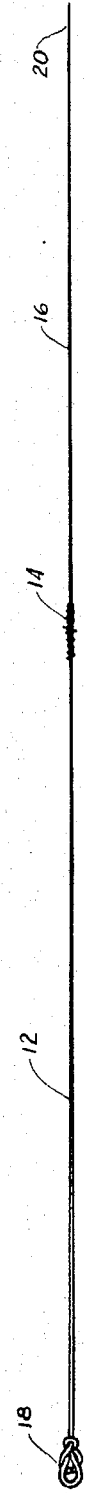
FIG. 1 is a schematic representation of the fly leader.

The fishing rod, the reel, the fishing line and the artificial fly or lure may all be conventional, and are not shown in the drawing. The fly leader which is used to connect the fishing line to the lure is shown in FIG. 1, and it comprises a nylon butt section 12 connected at 14 to a nylon tippet section 16. The butt section 12 is larger in diameter than the tippet section 16, and it preferably tapers from a loop 18 at the thicker end, which loop is tied to the fly fishing line, to the knot 14. Similarly the tippet section 16 tapers from the knot 14 to its free end 20, which of course is tied to the lure.

The butt section 12 is made of a nylon having a greater stiffness modulus than the tippet section 16, so that the latter is more flexible than the butt section for that reason as well as its smaller diameter. It has a greater tensile strength per square inch than the butt section, thus somewhat compensating for the decrease in diameter.

Figure 2:
FIG. 2 shows a barrel knot used to connect the tippet section to the butt section.

The sections may be tied together at 14 by a suitable knot, but it is preferred to use a barrel knot as shown in FIG. 2. For this purpose the ends to be joined are overlapped. Each is wrapped around the other 3 or 4 times, and the ends are brought back through the point of overlap, as shown in the drawing.

The butt section may be made of a Du Pont Type 0200 SA nylon monofilament sold under the name "Vylor" by Du Pont de Nemours & Co., of Wilmington, Del. The tippet section 16 may be made of a type 4506 SA nylon manufactured by the said Du Pont Company, or it may be type S3 made by the Soo Valley Co. of Columbia, S.C.

In terms of physical properties the above specified Du Pont nylon used for the butt section has a tensile strength of about 62,000 p.s.i. (pounds per square inch), an elongation of about 35%, a stiffness modulus when dry of about 650,000 p.s.i., a stiffness modulus when wet of about 230,000 p.s.i., and a melting point of about 496° F. The above specified Du Pont nylon used for the tippet section has a tensile strength of about 82,000 p.s.i., an elongation of about 27%, a stiffness modulus when dry of about 260,000 p.s.i., a stiffness modulus when wet of about 90,000 p.s.i., and a melting point of about 465° F.

It will be seen that the stiffness modulus of the butt section is more than double than that of the tippet section. The latter has a greater tensile strength, which helps compensate to some extent for its smaller diameter.

The entire leader is about 10 feet long. The butt section has a length of about 5½ feet, and in one particular case tapers from a diameter of about 0.023 inch to a diameter of about 0.014 inch. The tippet section has a length of about 4½ feet, and tapers in diameter from about 0.014 inch to about 0.008 inch. The tippet section section may gradually lose length when it is cut from one lure and tied to a different lure, and therefore in practice the leader may be sold with several tippet sections for each butt section. The foregoing diametrical dimensions are for a tippet capacity of 4½ lbs., and are given merely by way of example. The diameters of the leader may be appropriately changed for a greater or lesser capacity, as shown by the following examples as now sold commercially.

| Commercial designation | Type of fishing | Test strength in pounds | Large diameter of tippet | Small diameter of tippet |
|---|---|---|---|---|
| 1X | Wet fly—streamers popping bugs. | 7 | .015 | .010 |
| 2X | Wet fly—streamers fan wing. | 6 | .014 | .009 |
| 3X | #8 and #10 dry fly | 4½ | .014 | .008 |
| 4X | #12 dry fly | 3½ | .012 | .007 |
| 5X | #14–#16 dry fly | 2 | .012 | .006 |
| 6X | #20 dry fly | 1½ | .012 | .005 |

A lesser number of tapered butt sections are used with the foregoing six tippet sections. For the 1X tippet the butt section tapers from 0.023 inch to 0.015 inch. For the 2X and 3X tippets the butt section may taper from 0.023 inch to 0.014 inch. For the 4X, 5X and 6X tippets the butt section may taper from 0.023 inch to 0.012 inch.

It will be understood that these dimensions are given as examples now being sold, and are not intended to be in limitation of the invention.

The butt section provides the stiffness and body to "roll out" and to turn over the artificial fly or lure in a continuous flowing action from the fly line itself. The more flexible tippet section provides for the delicacy of presentation which permits the angler to present the lure in as natural a manner as possible. The best features of each of the two different types of nylon are combined in one leader.

It is believed that the construction of my improved fly leader as well as the advantages thereof, will be apparent from the foregoing detailed description.

I claim:

1. A fly leader for use at the end of a fishing line for fly fishing, said leader comprising a nylon butt section connected to a nylon tippet section, said butt section being larger in diameter than said tippet section, and said butt section being made of a nylon material having a greater stiffness modulus than the nylon material of said tippet section.

2. A fly leader as defined in claim 1, in which the butt section tapers in a direction from the fishing line to the tippet section, and in which the tippet section tapers in a direction from the butt section to the fly.

3. A fly leader as defined in claim 2, in which the stiffness modulus of the butt material of the section is more than double the stiffness modulus of the material of the tippet section.

4. A fly leader as defined in claim 3, in which the butt section tapers in a diameter from a large diameter of about 0.023 inch to a small diameter ranging from 0.012 to 0.015 inch, depending on the capacity of the tippet section, and in which the tippet section tapers in a range from a large diameter of about 0.015 inch to a small diameter of 0.010 inch for a 7 pound test strength at one end of the range, to a large diameter of about 0.012 inch tapering to a small diameter 0.005 inch for a 1½ pound test strength at the other end of the range.

5. A fly leader as defined in claim 4, in which the butt section is made of a nylon having a tensile strength of about 62,000 p.s.i. (pounds per square inch), an elongation of about 35%, a stiffness modulus when dry of about 650,000 p.s.i., a stiffness modulus when wet of about 230,000 p.s.i., and a melting point of about 496° F., and in which the tippet section is made of a nylon having a tensile strength of about 82,000 p.s.i., an elongation of about 27%, a stiffness modulus when dry of about 260,000 p.s.i., a stiffness modulus when wet of about 90,000 p.s.i., and a melting point of about 465° F.

6. A fly leader as defined in claim 2, in which the butt section tapers in diameter from a large diameter of about 0.023 inch to a small diameter ranging from 0.012 to 0.015 inch, depending on the capacity of the tippet section, and in which the tippet section tapers in a range from a large diameter of about 0.015 inch to a small diameter of about 0.010 inch for a 7 pound test strength at one end of the range, to a large diameter of about 0.012 inch tapering to a small diameter about 0.005 inch for a 1½ pound test strength at the other end of the range.

7. A fly leader as defined in claim 1, in which the butt section is made of a nylon having a tensile strength of about 62,000 p.s.i. (pound per square inch), an elongation of about 35%, a stiffness modulus when dry of about 650,000 p.s.i., a stiffness modulus when wet of about 230,000 p.s.i., and a melting point of about 496° F., and in which the tippet section is made of a nylon having a tensile strength of about 82,000 p.s.i., an elongation of about 27%, a stiffness modulus when dry of about 260,000 p.s.i., a stiffness modulus when wet of about 90,000 p.s.i., and a melting point of about 465° F.

8. A fly leader as defined in claim 2, in which the nylon of the tippet section has greater tensile strength per square inch than the butt section, in order to help compensate for its lesser diameter.

References Cited
UNITED STATES PATENTS 2,184,187  12/1939  Hildebrandt _____ 43—44.98
2,933,798   4/1960  Miller et al. _____ 43—44.98 X SAMUEL KOREN, Primary Examiner.

D. J. LEACH, Assistant Examiner.

U.S. Cl. X.R.

161—179